(12) United States Patent
Roeser et al.

(10) Patent No.: US 8,019,649 B2
(45) Date of Patent: Sep. 13, 2011

(54) METHOD OF MANAGING PROSPECTIVE BUSINESS

(75) Inventors: Prugh Roeser, Marblehead, MA (US); Stefan Roeser, Chelsea, MA (US)

(73) Assignee: The Devereux Group, Marblehead, MA (US)

( * ) Notice: Subject to any disclaimer, the term of this patent is extended or adjusted under 35 U.S.C. 154(b) by 1253 days.

(21) Appl. No.: 11/108,110

(22) Filed: Apr. 18, 2005

(65) Prior Publication Data

US 2006/0235759 A1    Oct. 19, 2006

(51) Int. Cl.
*G06Q 30/00*    (2006.01)

(52) U.S. Cl. .............. 705/26.1; 705/9; 705/10; 705/26; 705/27

(58) Field of Classification Search ............... 705/9, 10, 705/26, 27, 26.1
See application file for complete search history.

(56) References Cited

U.S. PATENT DOCUMENTS

| | | | |
|---|---|---|---|
| 5,450,385 A | 9/1995 | Ellis et al. | |
| 5,873,070 A | 2/1999 | Bunte et al. | |
| 6,182,053 B1 | 1/2001 | Rauber et al. | |
| 6,354,493 B1 | 3/2002 | Mon | |
| 6,464,133 B1 | 10/2002 | Gruber | |
| 6,488,212 B1 | 12/2002 | Maeder | |
| 6,510,992 B2 | 1/2003 | Wells et al. | |
| 6,520,407 B1 | 2/2003 | Nieswand et al. | |
| 6,550,674 B1 | 4/2003 | Neumark | |
| 6,557,752 B1 | 5/2003 | Yacoob | |
| 6,601,764 B1 | 8/2003 | Goodwin, III | |
| 6,639,156 B2 | 10/2003 | Luke et al. | |
| 6,650,240 B2 | 11/2003 | Lee et al. | |
| 6,659,338 B1 | 12/2003 | Dittmann et al. | |
| 6,659,344 B2 | 12/2003 | Otto et al. | |
| 6,674,361 B2 | 1/2004 | Cernusca et al. | |
| 6,681,989 B2 | 1/2004 | Bodin | |
| 2002/0059095 A1* | 5/2002 | Cook | 705/10 |
| 2003/0204437 A1* | 10/2003 | Flender et al. | 705/10 |
| 2006/0095324 A1* | 5/2006 | Vergeyle et al. | 705/14 |

* cited by examiner

*Primary Examiner* — Yogesh C Garg
(74) *Attorney, Agent, or Firm* — Lambert & Associates; Gary E. Lambert; David J. Connaughton, Jr.

(57) ABSTRACT

The present invention reveals the next generation in customer acquisition procedures. LeadMaker™ ("LM") is a relationship-based system for handling business customers and prospective customers during the period between initial response and follow up by sales. LM is designed to fill the gap between Marketing acquiring responses and Sales establishing primary contact responsibility.

3 Claims, 12 Drawing Sheets

OVERVIEW

METHOD OF MANAGING PROSPECTIVE BUSINESS

FIELD OF THE INVENTION

The present invention relates generally to the management of customers and potential customers and business leads.

BACKGROUND OF INVENTION

Since the institution of business venture, large and small business owners alike have been investigating systems which bring new customers into the stream of activity.

According to marketing association statistics, United States companies spend over $200 billion dollars yearly on business-to-business (B2B) marketing programs, and the results in terms of return on investment (ROI) and qualified leads fall far short of expectations.

A large part of this failure can be attributed to the gap between Marketing and Sales regarding lead acquisition and qualification. Marketing techniques appeal to prospective leads which are at each and every stage in the purchase process and thus Marketing acquires leads with a mix of brand associations and response offers. Yet Sales qualifies leads based on their likelihood of yielding revenue within the normal sales cycle.

Predictably, in the past, Sales forces have not been able to qualify many of the leads acquired by Marketing departments. Just as predictably, Sales forces have turned to other lead sources in their search for better leads. This wholly undermines the ability of Marketing departments to measure qualification levels, track final outcomes and calculate marketing ROI.

In addition to the billions spent on marketing programs, companies are spending billions more on technology for various marketing, sales and customer service activities. Reports estimate that total spending in these genres of activity will grow from $13 billion to $19 billion from 2001 to 2005.

Prior methods and systems basically served to reach outside people, with no established relationship to company, and encourage them to look at the product or service performed. The instant invention provides the novel approach of a system and method that actually monitors, evaluates and processes already established relationships in a manner which qualifies these relationships for further evaluation levels. The system also provides for control by individual clients who are allowed to develop their own system of rules by which to evaluate responses from customers and prospective customers. Each client company develops its own rules driven segmentation strategy to sort leads into separate groups for personalized campaign development.

SUMMARY OF THE INVENTION

The present invention reveals the next generation in customer acquisition procedures. LeadMaker™ ("LM") is a relationship-based system for handling business customers and prospective customers during the period between initial response and follow up by sales. LM is designed to fill the gap between Marketing acquiring responses and Sales establishing primary contact responsibility. In a market where often today's leads are more like mere inquiries, LM works to upgrade interest levels among responses to demand generation efforts and renders leads more sales ready. Additionally, LM creates a complete record of each lead's responses and resulting behavior.

Further, LM serves to treat new leads like new customers. Among the manners in which LM executes this action is to actively collaborate in a lead's decision making process, inform the buying process and actively support the internal review and approval process. This interaction adds a partnership dimension to the vendor relationship and keeps the same level of data for leads as for customers.

Whereas prior business practices dictated a quick hand off to a strictly sales-oriented environment with predefined sales criteria in mind, the LM system nurtures the relationship at the individual lead level. Marketing will now support sales efforts by remaining involved until the late stages, deemed "almost closed" audiences. By standardizing various interest levels and grouping leads according to these levels, LM can create and deliver a thematically-structured series of LM communications and offers.

In a computerized form, the LeadMaker™ system combines personalized, progressive, interactive, buyer-oriented communications and offers with individualized, response-driven content and schedules, dynamic lead segmentation, and response management. LM includes back-end Sales integration, and automates the following functions: sales representative assignments, personalized communications from sales reps, sales rep notifications of new leads, lead forwarding to sales reps based on client triggers, and follow up with Sales regarding lead statuses, outcomes and revenues. LM also provides on-line, real-time reporting of leads in the system, including individual and group response behaviors, profile data, final outcomes, deal sizes and ROI.

Further LM automates the qualification of incoming leads through said series of progressive, interactive, buyer-oriented, communications that offer buying expertise in exchange for lead profile data. For example, LM offers white papers, product comparison worksheets, ROI calculators, etc. in exchange for contact information, interests, timelines, budgets, etc.

In no way limiting the arenas in which LM may be utilized, among others, LM is favorably targeted for use in manufacturing, technology and service companies in all industry sectors that have demonstrated a willingness to spend on automating Marketing and Sales functions, and whose products require complex selling, necessitate extended customer evaluation or involve protracted sales cycles.

The invention shown comprises a method of managing customers and potential customers indissolubly combining: data profiling and enhancement; a multiplicity of proactive purchase process focused communications; a multiplicity of purchase process focused responder experiences, and coordination and follow-up with sales responsibility individuals.

The method of data profiling and enhancement further comprises the indissoluble combination of: receiving data inputs which may be in the form of customers and potential customers; determining whether each of said customers and potential customers may be eligible; validating whether each of said customers and potential customers may be deliverable; segmenting said customers and potential customers into groups; assigning sales responsibility individuals to said customers and potential customers.

Additionally, the method of said multiplicity of proactive purchase process focused communications further comprises the indissoluble combination of: defining a multiplicity of series of original communications which may correlate to steps of a purchase process of said customers and potential customers and developing a multiplicity of response incentives which may correlate to said steps of said purchase processes of said customers and potential customers. Further, the method of proactive purchase process focused communications further comprises communications which may be individually personalized with profile information, behavioral information, interest information, and sales responsibility information for each said customer or potential customer. Further, said communications may encompass a graphical appearance and audio presence consistent with organizational guidelines. Also, the method of proactive purchase process focused communications may further comprise follow-up communications to said customers and potential customers upon failure to respond to said original communications which may be automated, and a multiplicity of schedules for directing original communications to said customers and potential customers and a multiplicity of schedules for directing automatic non-responder follow up communications which may be established.

Further, the method of proactive purchase process focused communications may further comprise communications which may be directed to said customers and potential customers based upon a multiplicity of schedule timings and a multiplicity of individual eligibilities of said customers and said potential customers, wherein said schedules for directing original communications may be based on a multiplicity of individual profiles, response behaviors, and response incentive utilization by said customers and potential customers.

Additionally, the method of said multiplicity of purchase process focused responder experiences further comprises the indissoluble combination of creating a multiplicity of response destinations which may individually identify said customers and said potential customers that respond to said proactive purchase process focused communications directed to said customers and said potential customers; creating a multiplicity of response destinations which may correlate to a multiplicity of backgrounds, a multiplicity of profiles and a multiplicity of interests of said customers and said potential customers in order to prompt responses from said customers and said potential customers.

The method of said multiplicity of purchase process focused responder experiences may further comprise creating a multiplicity of purchase focused questions which may be completed by said customers and potential customers wherein said customers respond in exchange for delivery of response incentives; and personalizing said multiplicity of response destinations individually with profile information and behavioral information from each of said customers or potential customers which may respond. The method of said multiplicity of purchase process focused responder experiences may further comprise creating a multiplicity of response destinations, which encompass a graphical appearance and audio presence consistent with organizational guidelines.

Further, the method of said purchase focused experiences for responders further comprises the indissoluble combination of monitoring a multiplicity of communications delivery behaviors, communications receipt behaviors, and communications response behaviors of said customers and said potential customers, recording said multiplicity of communications delivery, communications receipt, and communications response behaviors of said customers and said potential customers individually and reporting said multiplicity of communications delivery, communications receipt, and communications response behaviors of said customers and said potential customers. Additionally, said multiplicity of communications delivery behaviors and said multiplicity of communications receipt behaviors and said multiplicity of communications response behaviors of said customers and said potential customers may further compromise utilizing a multiplicity of differing traceable media responses.

Further the method of coordination and follow-up with sales responsibility individuals further comprises the indissoluble combination of identifying appropriate sales responsibility individuals to receive notifications of qualifying behaviors and forwarding of qualifying customers and potential customers. Additionally, said coordination and follow-up with sales responsibility individuals may comprise notifying said sales responsibility individuals of qualifying response behaviors of said customers and said potential customers, and identifying qualifying customers and qualifying potential customers for forwarding to said sales responsibility individuals.

Further the method of said coordination and follow-up with sales responsibility individuals may comprise routing said qualifying customers and potential customers to said appropriate sales responsibility individuals and contacting said sales responsibility individuals after receipt of said qualifying customers and potential customers to track a multiplicity of individual sales outcomes. Moreover, the method of said coordination and follow-up with sales responsibility individuals may comprise recording said multiplicity of individual sales outcomes of said qualifying customers and potential customers and reporting said customer and potential customer qualifications, said multiplicity of sales statuses and said multiplicity of sales outcomes of qualified customers and potential customers.

In addition, said multiplicity of individual sales outcomes may further comprise a multiplicity of differing status updates and said multiplicity of differing status updates may be selected from the group consisting of contact status, sales status and transaction amounts. Further, said multiplicity of purchase focused questions may be selected from the group consisting of demographics, product and service usages, product and service interests, and organizational purchasing processes and intentions.

Further, in addition to the above described method, the LeadMaker™ automated lead qualification system can further be described as a method of managing customers and potential customers comprising: a multiplicity of series of marketing communications; a database-driven, web-hosted ASP application; and customized sets of rules for individual client companies; wherein said individual client companies export a multiplicity of customers and potential customers into said database driven, web hosted ASP application; wherein said multiplicity of customers and potential customers are selected from the group consisting of responders to lead generation activities by said individual client companies; wherein said multiplicity of customers and potential customers become a multiplicity of prospects; wherein said sequence of actions utilized in evaluating said multiplicity of prospects are campaigns composed of a multiplicity of individual segments; and, wherein said individual client companies develop rules driven segmentation strategies to sort said multiplicity of prospects into a multiplicity of groups for personalized campaign development.

Also, said campaigns include a multiplicity of series of communications delivered according to a multiplicity of designated time intervals. Further, readiness levels of said multiplicity of prospects to buy are increased due to said multiplicity of series of communications. Additionally, upon receipt of a response from one of said prospects, said system initiates another communication in a pre-defined sequence. Moreover, in said system, a multiplicity of non-responders receives automatic follow-up communications at pre-determined intervals after original communications.

Further the LeadMaker™ automated lead qualification system may include features wherein said individual client companies incorporate sales responsibility individuals in said campaigns by personalizing said communications from said sales responsibility individuals at any time during campaigns. Said automated lead qualification system may also include features wherein a multiplicity of results is tracked and reported for each of said multiplicity of individual segments within said campaigns and said results are aggregated across said campaigns.

Said system may also include a provision wherein returns on investment can be measured for said campaigns when said sales responsibility individuals enter a multiplicity of transactional data at the close of each sale. In addition, said system may be configured such that a point at which leads are funneled to said sales responsibility individuals is contingent upon said customized sets of rules for individual client companies.

The invention can further be described as a method of managing customers and potential customers comprising: a communications management process; a data management process; a response experience management process; and a sales coordination process. The method of the communications management process may further comprise: setting a multiplicity of series of outbound communications; developing a multiplicity of incentives for a multiplicity of customers and potential customers; creating a multiplicity of communications content; setting a multiplicity of levels of personalization for said multiplicity of communications content; creating brand-aware graphic or audio presence; setting a multiplicity of follow-up communications for a multiplicity of customers and potential customers which do not respond to the multiplicity of original communications; setting a multiplicity of a communications schedules; and directing said multiplicity of communications to said multiplicity of customers and potential customers.

Additionally, the method of the data management process may further comprise: validating a multiplicity of customers and potential customers; identifying said multiplicity of customers and potential customers; filtering said multiplicity of customers and potential customers; assigning said multiplicity of customers and potential customers to a multiplicity of initial groupings; and, assigning said multiplicity of customers and potential customers to sales responsibility individuals.

Further, the method of the response experience management process may further comprise: tracking a multiplicity of behavior patterns of a multiplicity of recipients to a multiplicity of communications; managing a multiplicity of experiences of a multiplicity of customers and potential customers which responded: and tracking said multiplicity of behaviors of said multiplicity of customers and potential customers which responded.

Finally, the method of the sales coordination process may further comprise: profiling and qualifying said customers and potential customers which respond; forwarding said customers and potential customers which respond to sales responsibility individuals; and, gathering a multiplicity of results from said customers and potential customers which respond from said sales responsibility individuals.

Said multiplicity of delivery behaviors and receipt behaviors of said customers and said potential customers may further comprise a set of differing traceable media responses and these responses are not limited by, but may be selected from the group consisting of e-mail bounces, opens, click-throughs, and unsubscribes. Additionally, said multiplicity of response behaviors and said multiplicity of receipt behaviors of said multiplicity of customers and said potential customers may further comprise a set of differing traceable media responses and these responses are not limited by, but may be selected from the group consisting of data submissions, profile question responses, response incentive requests and deliveries.

The possible e-mail communications delivery/receipt behaviors to be monitored may comprise but are not limited to an e-mail bounce or e-mail open. The possible e-mail communications response behaviors may comprise but are not limited to e-mail click throughs, web site viewing, data submissions, profile question responses, incentive requests, incentive downloads, information requests, information downloads, unsubscribe (opt out) requests, e-mail forwarding (pass alongs), e-mail responses to sender or third parties, telephone responses to sender or third parties, postal responses to sender or third parties. Further the possible direct mail communications delivery/receipt behaviors may comprise but are not limited to undeliverable responses and the direct mail communications response behaviors may comprise but are not limited to web site viewing, data submissions, profile question responses, incentive requests, incentive downloads, information requests, information downloads, do not mail (opt outs) requests, e-mail responses to sender or third parties, telephone responses to sender or third parties, postal responses to sender or third parties. Also, the telemarketing communications delivery/receipt behaviors may comprise but are not limited to no answer, incorrect or disconnected phone number, busy, left message, callback. Additionally, the telemarketing communications response behaviors may comprise but are not limited to spoke with target name: no interest, spoke with target name: future interest, spoke with target name: active interest, web site viewing, data submissions, profile question responses, incentive requests, incentive downloads, information requests, information downloads, do-not-call (opt out) requests, e-mail responses to sender or third party, telephone responses to sender or third party, postal responses to sender or third party.

In a computerized form, the LeadMaker™ automated lead qualification system can further be described as a method of managing customers and potential customers which combines personalized, progressive, interactive, buyer-oriented e-mail communications with individualized, response-driven contact schedules, dynamic lead segmentation, and response management. The method of LeadMaker™ may also automate sales rep assignments, sales rep notifications of new leads, lead forwarding to sales reps based on client triggers, and Sales follow up regarding lead status, outcome and revenue. The method of LeadMaker™ may also provide on-line, real-time reporting of leads in the system, including individual and group response behaviors, profile data, final outcomes, deal sizes and ROI.

These and other features, aspects and advantages of the present invention will become better understood with reference to the following description, claims, and accompanying drawings. Therefore, the form of the invention, as set out above, should be considered illustrative and not as limiting the scope of the novel design of the instant invention as set out in the following claims.

DESCRIPTION OF THE INVENTION

Figure 1:
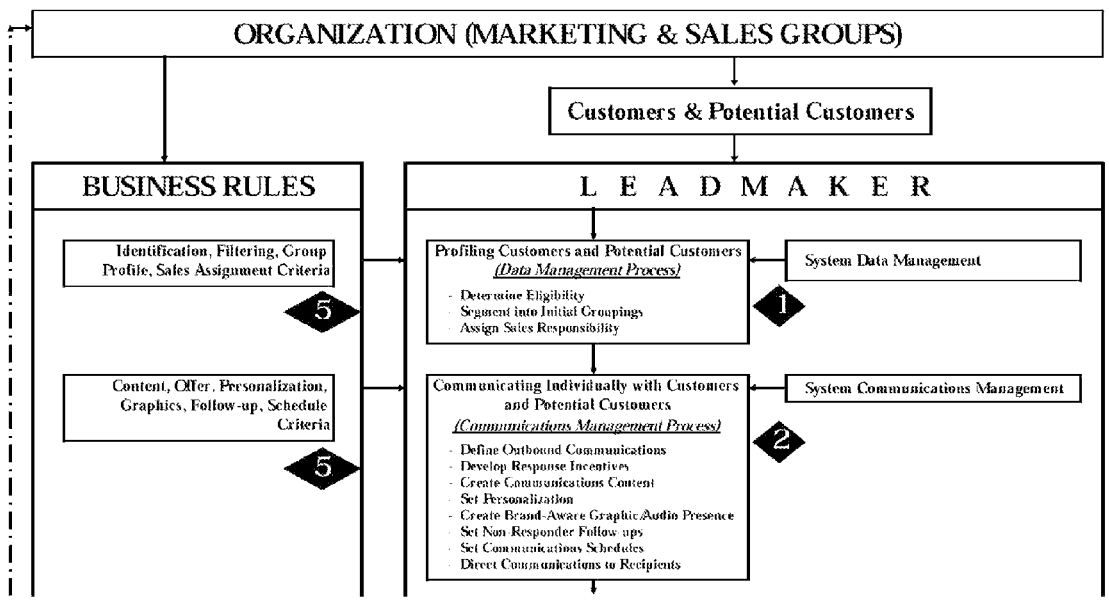
FIG. 1 is the first segment of a chart illustrating a general overview of the LeadMaker™ automated lead qualification system including the integration of elements of the Data Management Process, Communications Management Process, Response Experience Management Process; Sales Coordination Process.
Figure 2:
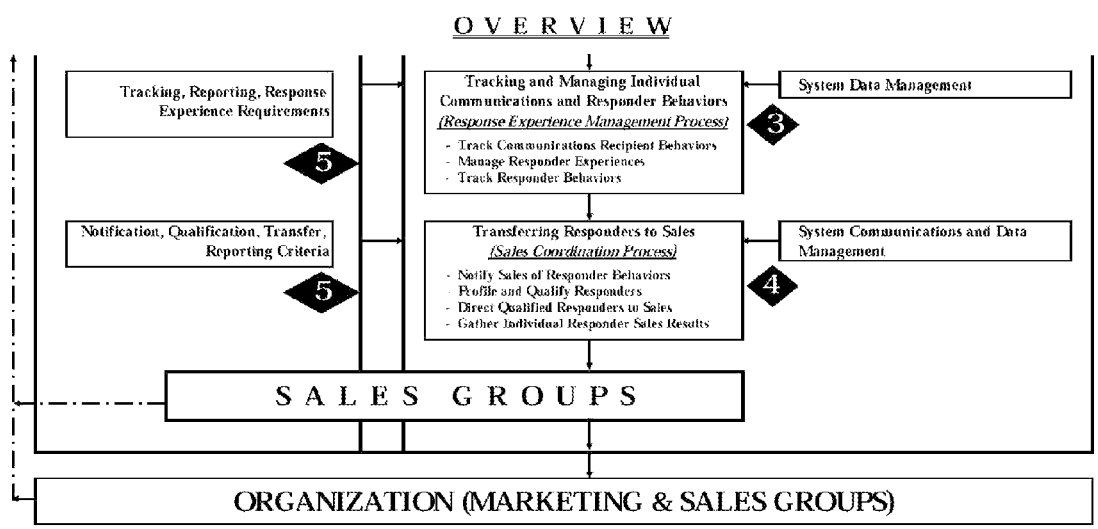
FIG. 2 hereof is the second and final segment the chart illustrating a general overview of the LeadMaker™ automated lead qualification system including the integration of elements of the Data Management Process, Communications Management Process, Response Experience Management Process; Sales Coordination Process.

Referring to FIG. 1 is the first segment of a chart illustrating a general overview of the system including the integration of elements of the Data Management Process 1, the Communications Management Process 2, Response Experience Management Process 3; Sales Coordination Process 4, broad-based examples of Business Rules 5, which are determined by the individual client, as discussed herein. FIG. 2 is the second and final segment the chart illustrating a general overview of the system including the integration of elements of the Data Management Process 1, Communications Management Process 2, Response Experience Management Process 3; Sales Coordination Process 4.

Figure 3:
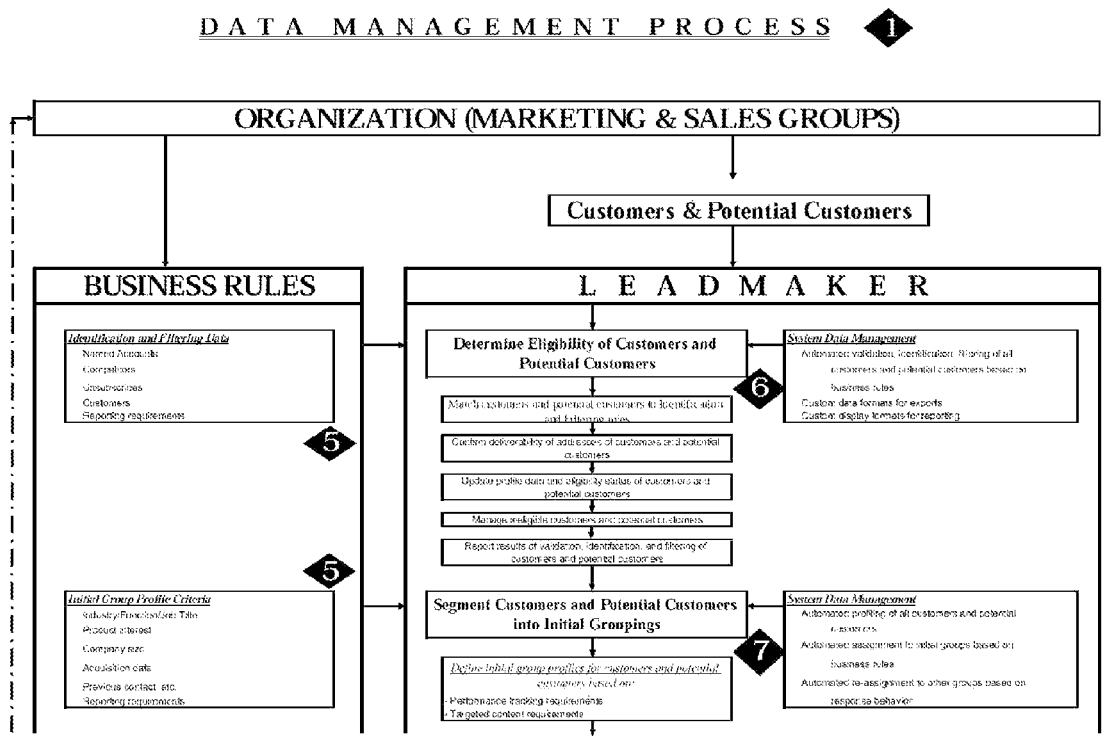
FIG. 3 hereof is the first segment of a chart illustrating the Data Management Process, and specifically displaying the Determine Eligibility of Customers and Potential Customers phase and the first portion of the Segmenting Customers and Potential Customers into Initial Groupings phase.
Figure 4:
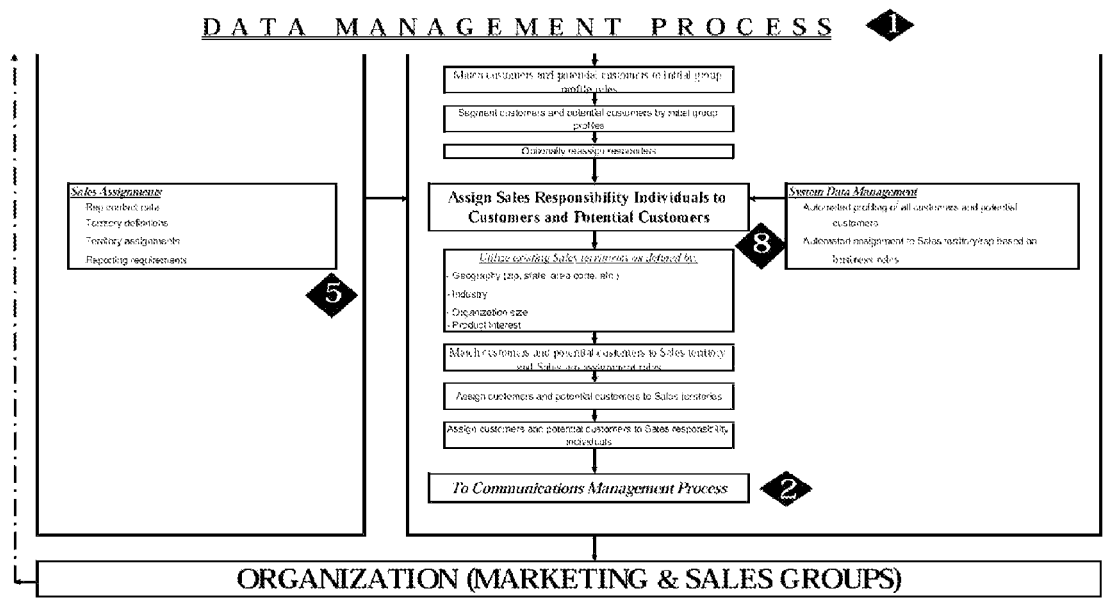
FIG. 4 hereof is the second and final segment of a chart illustrating the Data Management Process and specifically displaying the second and final portion of the Segmenting Customers and Potential Customers into Initial Groupings phase, and the Assign Sales Responsibility Individuals to Customers and Potential Customers phase.
Figure 5:
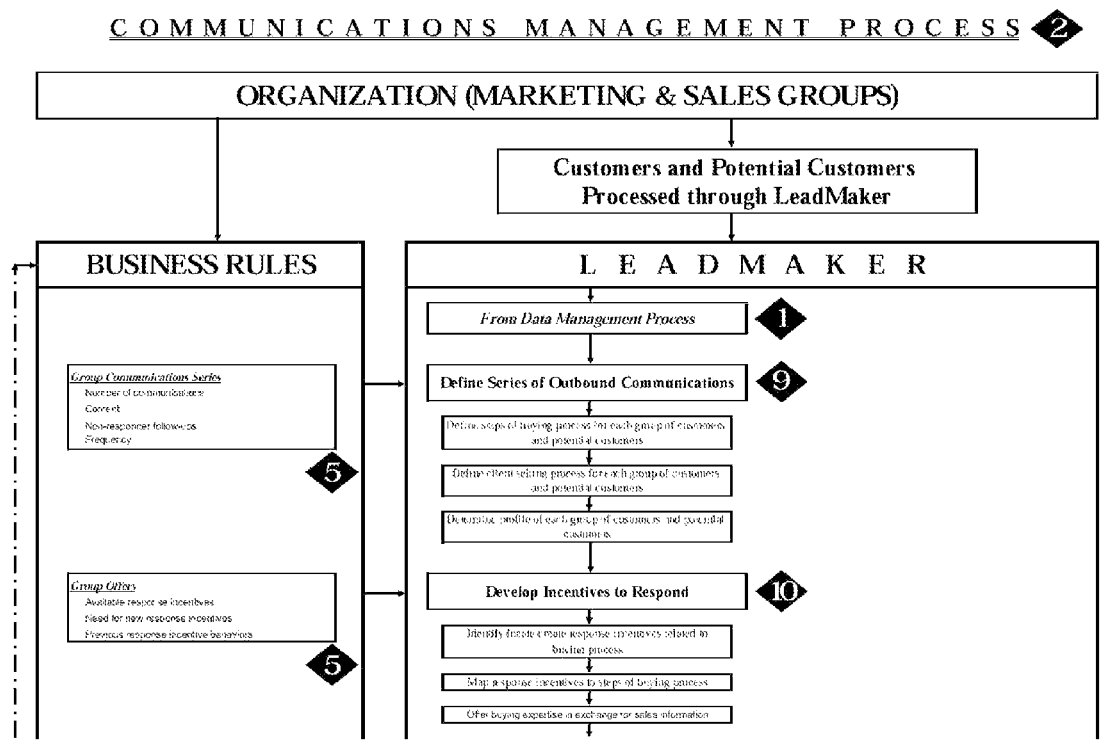
FIG. 5 hereof is the first segment of a chart illustrating the Communications Management Process and specifically displaying the Define Series of Outbound Communications phase and the first portion of the Develop Incentives to Respond phase.
Figure 6:
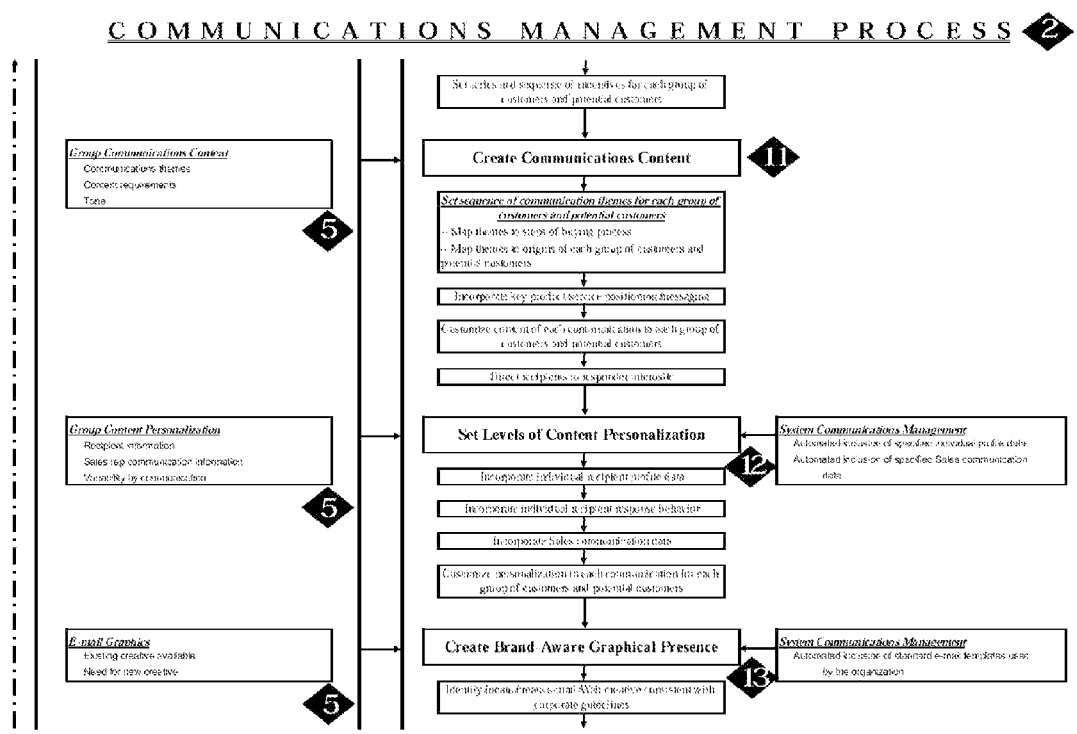
FIG. 6 hereof is the second segment of a chart illustrating the Communications Management Process and specifically displaying the second and final portion of the Develop Incentives to Respond phase, the Create Communications Content phase, the Set Levels of Content Personalization phase, and the Create Brand-Aware Graphical Presence phase.

FIG. 3 is the first segment of a chart illustrating the Data Management Process 1, and specifically displaying the Determine Eligibility of Customers and Potential Customers Phase 6 and the Segmenting Customers and Potential Customers into Initial Groupings Phase 7. FIG. 4 is the second and final segment of a chart illustrating the Data Management Process 1, and specifically displaying the Assign Sales Responsibility Individuals to Customers and Potential Customers phase 8;

FIG. 5 hereof is the first segment of a chart illustrating the Communications Management Process 2, and specifically displaying the Define Series of Outbound Communications phase 9 and the Develop Incentives to Respond phase 10. FIG. 6 hereof is the second segment of a chart illustrating the Communications Management Process 2, and specifically displaying the Create Communications Content phase 11, Set Levels of Content Personalization phase 12, and Create Brand-Aware Graphical Presence phase 13.

Figure 7:
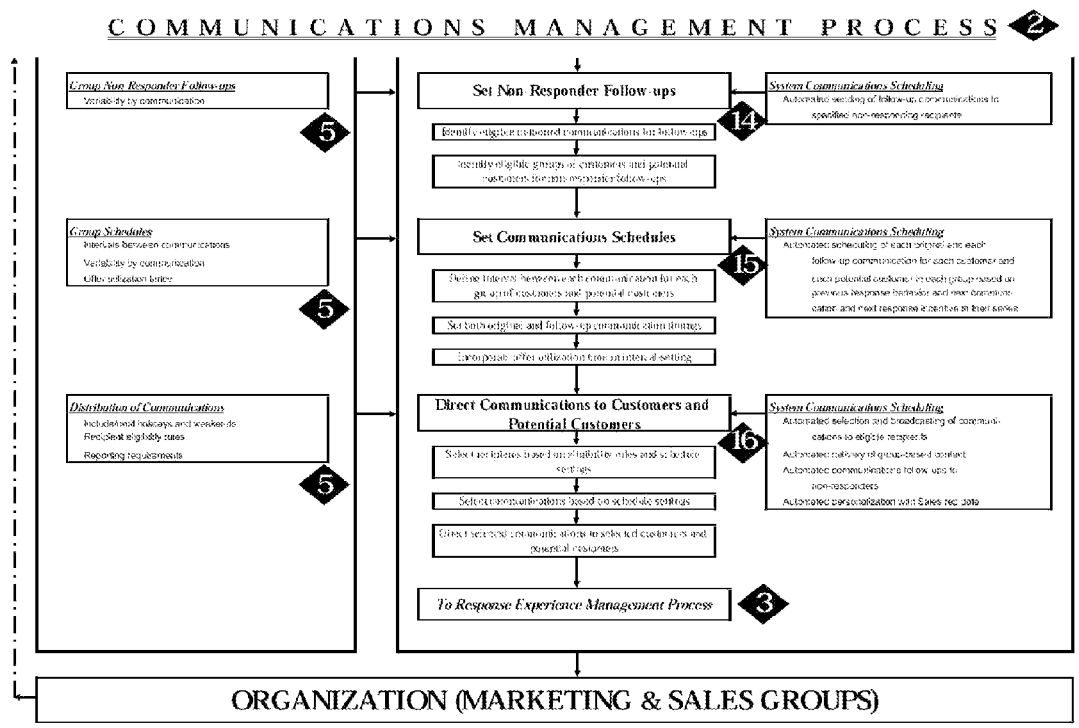
FIG. 7 hereof is the third and final segment of a chart illustrating the Communications Management Process and specifically displaying the Set Non-Responder Follow-ups phase, the Set Communications Schedules phase, and the Direct-Communications to Customers and Potential Customers phase.

FIG. 7 hereof is the third and final segment of a chart illustrating the Communications Management Process 2, and specifically displaying the Set Non-Responder Follow-ups phase 14, Set Communications Schedules phase 15 and Direct Communications to Customers and Potential Customers phase 16.

Figure 8:
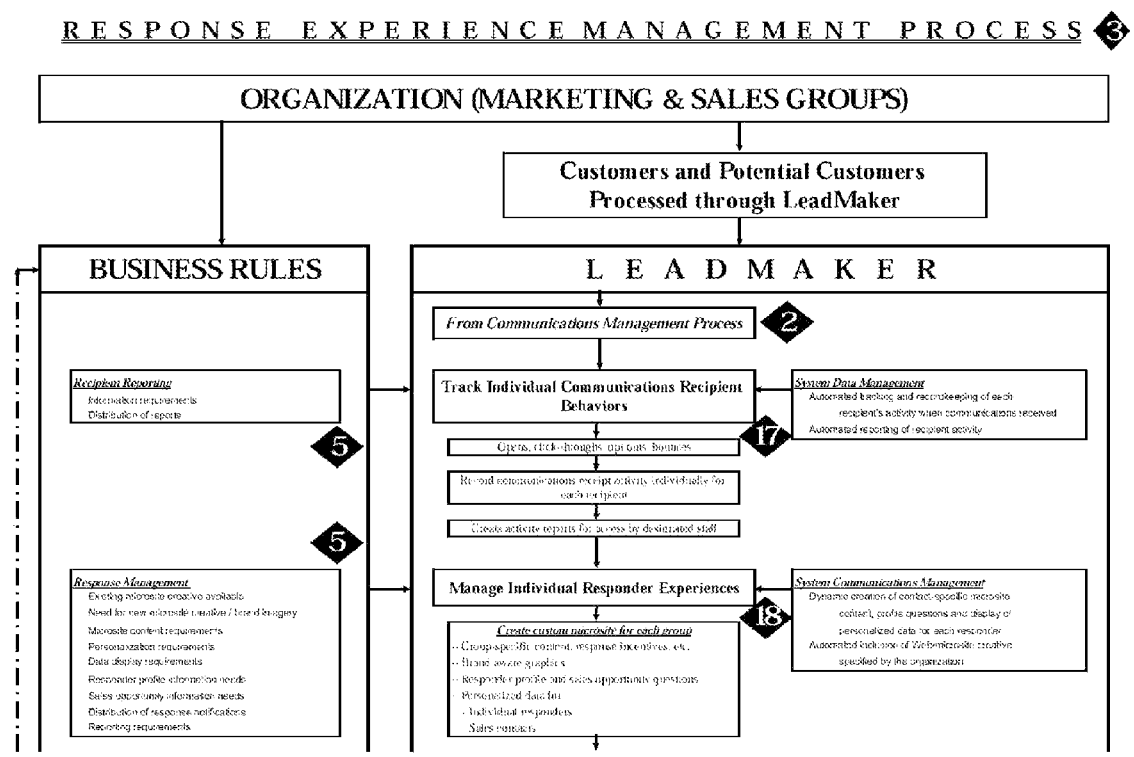
FIG. 8 hereof is the first segment of a chart illustrating the Response Experience Management Process phase and specifically displaying the Tracking Individual Communications Recipient Behaviors phase and the first portion of the Manage Individual Responder Experiences phase.
Figure 9:
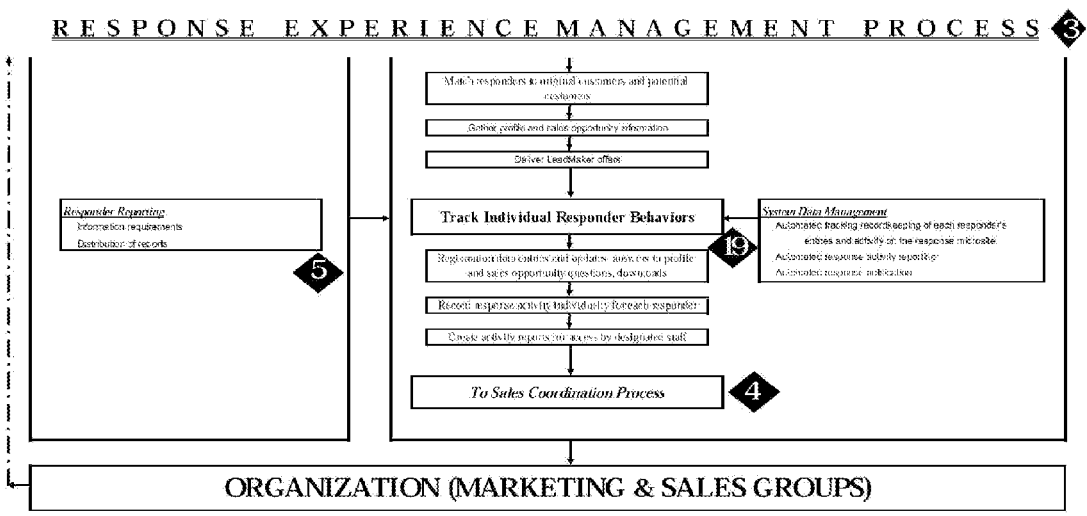
FIG. 9 hereof is the second and final segment of a chart illustrating the Response Experience Management Process and specifically displaying the second and final portion of the Manage Individual Responder Experiences phase, and the Track Individual Responder Behaviors phase.

FIG. 8 hereof is the first segment of a chart illustrating the Response Experience Management Process phase 3, and specifically displaying the Tracking Individual Communications Recipient Behaviors phase 17 and Manage Individual Responder Experiences phase 18. FIG. 9 hereof is the second and final segment of a chart illustrating the Response Experience Management Process 3, and specifically displaying the Track Individual Responder Behaviors phase 19.

Figure 10:
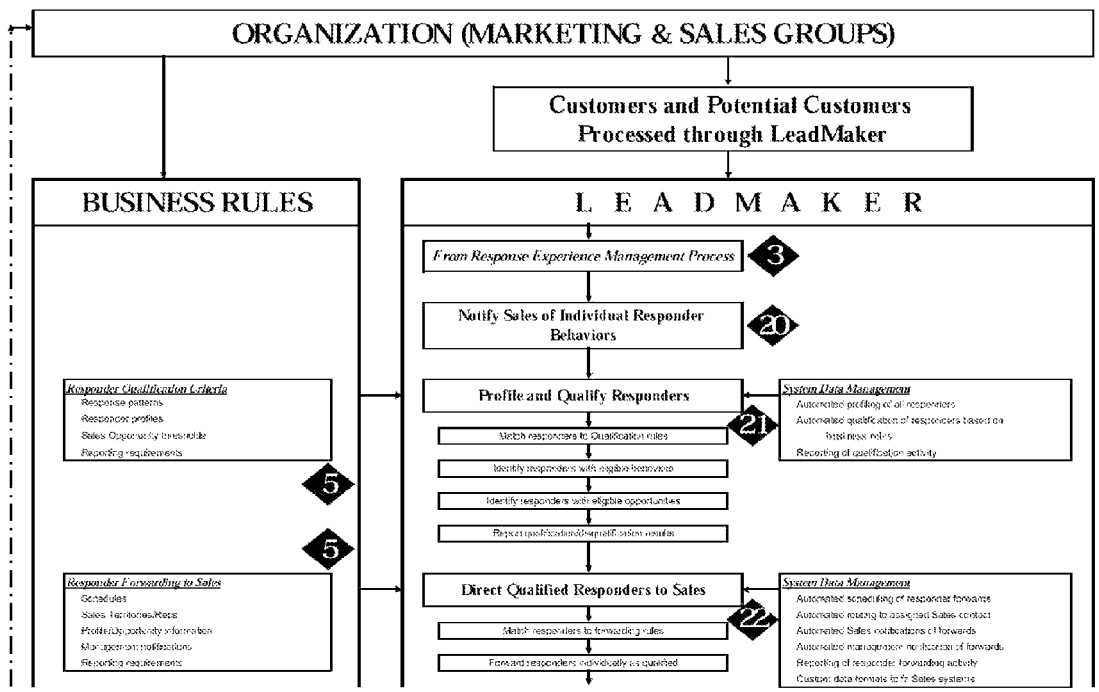
FIG. 10 hereof is the first segment of a chart illustrating the Sales Coordination Process and specifically displaying the Notify Sales of Individual Responder Behaviors phase, the Profile and Qualify Responders phase and the first portion of the Direct Qualified Responders to Sales phase.
Figure 11:
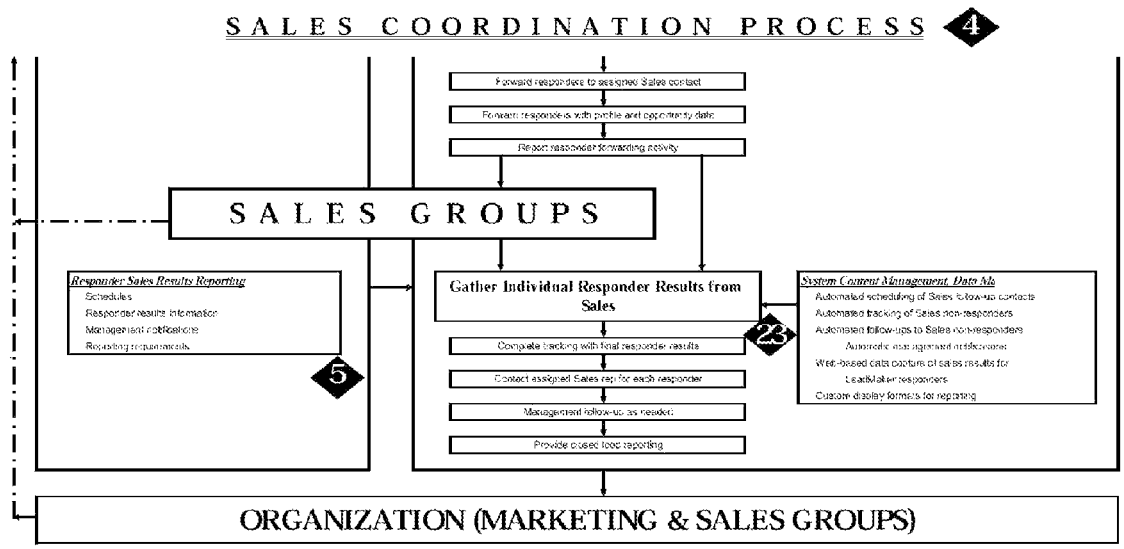
FIG. 11 hereof is the second and final segment of a chart illustrating the Sales Coordination Process and specifically displaying the second and final portion of the Direct Qualified Responders to Sales phase, and the Gather Individual Responder Results from Sales phase.

FIG. 10 hereof is the first segment of a chart illustrating the Sales Coordination Process 4, and specifically displaying the Notify Sales of Individual Responder Behaviors phase 20, the Profile and Qualify Responders phase 21 and the Direct Qualified Responders to Sales phase 22. FIG. 11 hereof is the second and final segment of a chart illustrating the Sales Coordination Process 4, and specifically displaying the Gather Individual Responder Results from Sales phase 23.

Figure 12:
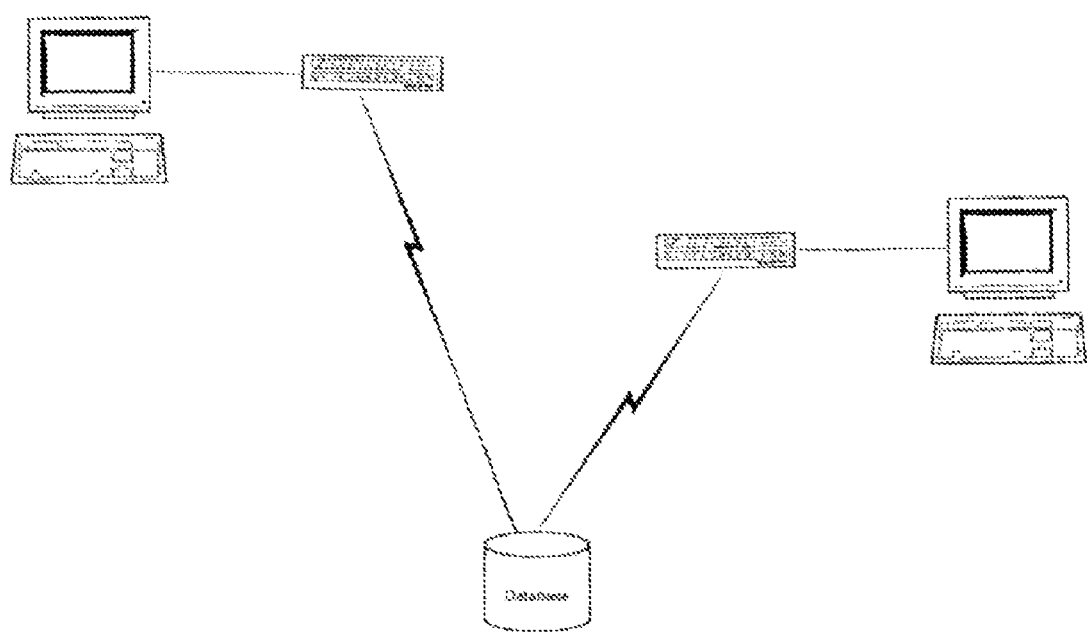
FIG. 12 hereof is a diagram of the physical embodiment of the system which can be employed to utilize the method.

FIG. 12 hereof is a diagram of the physical embodiment of the system utilizing the method.

What is claimed is:

1. A computerized method for identifying a solution to address managing a multiplicity of customers and potential customers in a specific industry comprising the steps of:
   determining whether each of said customers and potential customers are eligible by matching said customers and potential customers to Identification and Filtering Data;
   validating whether each of said customers and potential customers are deliverable by confirming the deliverability of addresses of said customers and potential customers;
   segmenting said customers and potential customers into groups;
   profiling and enhancement of data automatically by a computerized system wherein said profiling and enhancement of data comprises the steps of:
      receiving data inputs in the form of customers and potential customers; and
      assigning automatically by the computerized system sales responsibility individuals to said customers and potential customers;

generating automatically by the computerized system a multiplicity of proactive purchase process focused communications;
wherein said multiplicity of proactive purchase process focused communications further comprise the steps of:
defining automatically by the computerized system a multiplicity of series of original communications; and
developing automatically by the computerized system a multiplicity of response incentives;
wherein said multiplicity of proactive purchase process focused communications further comprises communications which are individually personalized with profile information, behavioral information, interest information, and sales responsibility information for each said customer or potential customer;
wherein said multiplicity of proactive purchase process focused communications further comprises a graphical appearance and audio presence;
wherein said multiplicity of proactive purchase process focused communications further comprises follow-up communications to said customers and potential customers upon failure of said customers and potential customers to respond to said original communications, a multiplicity of schedules for directing original communications to said customers and potential customers, and a multiplicity of schedules for directing automatic non-responder follow up communications;
wherein said multiplicity of proactive purchase process focused communications further comprises communications directed to said customers and potential customers based upon a multiplicity of schedule timings and a multiplicity of individual eligibilities of said customers and said potential customers, wherein said schedules for directing original communications are based on a multiplicity of individual profiles, response behaviors, and response incentive utilization by said customers and potential customers;
generating automatically by the computerized system a multiplicity of purchase process focused responder experiences, coordinating and managing automatically by the computerized system a multiplicity of sales responsibility individuals;
wherein said multiplicity of purchase process focused responder experiences further comprises the steps of:
creating automatically by the computerized system a multiplicity of response destinations which individually identify each of said multiplicity of customers and said potential customers that respond to said multiplicity of proactive purchase process focused communications;
creating automatically by the computerized system a multiplicity of response destinations which correlate to and extend said multiplicity of proactive purchase focused communications directed to said multiplicity of customers and potential customers;
creating automatically by the computerized system a multiplicity of response destinations which correlate to a multiplicity of backgrounds, a multiplicity of profiles and a multiplicity of interests of said multiplicity of customers and potential customers in order to prompt responses from said multiplicity of customers and potential customers;
creating automatically by the computerized system a multiplicity of profile and sales opportunity questions to be completed by said multiplicity of customers and potential customers wherein said multiplicity of customers and potential customers respond in exchange for delivery of said multiplicity of response incentives;
personalizing automatically by the computerized system said multiplicity of response destinations individually with profile information, behavioral information, interest information, and sales responsibility individual information from each of said multiplicity of customers and potential customers which responds; and,
wherein said multiplicity of purchase process focused responder experiences further comprises the steps of:
creating a multiplicity of purchase focused questions which are completed by said customers and potential customers, wherein said customers respond in exchange for delivery of response incentives; and
personalizing said multiplicity of response destinations individually with profile information and behavioral information from each of said customers or potential customers
wherein said multiplicity of purchase process focused responder experiences further comprises creating a multiplicity of response destinations, which encompass a graphical appearance and audio presence.

2. The computerized method for identifying a solution to address managing a multiplicity of customers and potential customers in a specific industry of claim 1 further comprising the steps of:
Monitoring individually by the computerized system each of a multiplicity of communications delivery behaviors and communications receipt behaviors of said multiplicity of customers and potential customers;
recording individually by the computerized system each of said multiplicity of communications delivery behaviors and communications receipt behaviors of each of said multiplicity of customers and potential customers;
monitoring individually by the computerized system each of a multiplicity of communications response behaviors of said multiplicity of customers and potential customers;
recording individually by the computerized system each of said multiplicity of communications response behaviors of each of said multiplicity of customers and potential customers; and,
reporting said multiplicity of communications delivery behaviors, said multiplicity of communications receipt behaviors and said multiplicity of communications response behaviors of said multiplicity of customers and said potential customers.

3. The computerized method for identifying a solution to address managing a multiplicity of customers and potential customers in a specific industry of claim 2 wherein said multiplicity of communications delivery behaviors and said multiplicity of communications receipt behaviors and said multiplicity of communications response behaviors of said multiplicity of customers and potential customers further comprise utilizing a multiplicity of differing traceable media responses.

* * * * *